United States Patent
Mazoyer et al.

(10) Patent No.: US 12,017,696 B2
(45) Date of Patent: Jun. 25, 2024

(54) VEHICLE FOR AN INFANT

(71) Applicant: ID DEVELOPMENT LIMITED, Kowloon (HK)

(72) Inventors: Joseph Mazoyer, Lyons (FR); Philippe Bajard, Lyons (FR)

(73) Assignee: ID DEVELOPMENT LIMITED, Kowloon (HK)

( * ) Notice: Subject to any disclaimer, the term of this patent is extended or adjusted under 35 U.S.C. 154(b) by 36 days.

(21) Appl. No.: 17/663,855

(22) Filed: May 18, 2022

(65) Prior Publication Data

US 2023/0013429 A1 Jan. 19, 2023

(30) Foreign Application Priority Data

May 18, 2021 (FR) ...................................... 2105142

(51) Int. Cl.
*B62B 7/06* (2006.01)
*B62B 7/04* (2006.01)
(Continued)

(52) U.S. Cl.
CPC ................ *B62B 7/06* (2013.01); *B62B 7/042* (2013.01); *B62B 7/044* (2013.01); *B62J 25/04* (2020.02); *B62K 9/02* (2013.01)

(58) Field of Classification Search
CPC ........... B62B 7/06; B62B 7/042; B62B 7/044; B62B 7/086; B62B 7/00; B62B 7/04; B62B 7/12; B62B 9/102; B62B 9/24; B62B 9/245; B62B 2205/12; B62B 2205/00; B62K 15/008; B62K 15/00; B62K 15/006; B62K 9/02; B62K 9/00; B62K 13/00; B62K 13/04; B62K 2015/003

See application file for complete search history.

(56) References Cited

U.S. PATENT DOCUMENTS

| 2,619,364 | A | * | 11/1952 | Carson | ..................... B62K 9/02 280/287 |
| 3,784,247 | A | * | 1/1974 | Mills | ....................... G05G 1/60 74/564 |

(Continued)

FOREIGN PATENT DOCUMENTS

| CN | 108327826 | A | * | 7/2018 | |
| CN | 111924032 | A | * | 11/2020 | ........... B62K 15/006 |

(Continued)

*Primary Examiner* — Steve Clemmons
(74) *Attorney, Agent, or Firm* — Defillo & Associates, Inc.; Evelyn A. Defillo

(57) ABSTRACT

A vehicle for an infant having a vehicle body (10) having a front end (11) and a rear end (12), a front steering unit (20) mounted on the front end (11) and including a steering column (21) on which a front wheel (31) and a handlebar (22) are mounted, a seat (41) mounted between the front end (11) and the rear end (12), a first rear wheel (321) connected to the vehicle (10) body via a first wheel carrier (171) and a second rear wheel (322) connected to the vehicle body (10) via a second wheel carrier (172), the first and the second wheel carriers (171, 172) being rotatably mounted on the rear end (12) between a compact configuration and a deployed configuration, the first and the second wheel carriers (171, 172) being movable between the two configurations independently of each other.

7 Claims, 3 Drawing Sheets

(51) Int. Cl.
*B62J 25/04* (2020.01)
*B62K 9/02* (2006.01)

(56) References Cited

U.S. PATENT DOCUMENTS

| | | | | |
|---|---|---|---|---|
| 4,174,852 | A * | 11/1979 | Panzica | B62J 25/04 74/564 |
| 5,826,900 | A * | 10/1998 | Steele | B62J 25/06 182/91 |
| 6,719,316 | B1 * | 4/2004 | Anthony | B62J 25/04 74/564 |
| 7,568,720 | B2 * | 8/2009 | Golias | B62K 15/008 280/287 |
| 7,988,168 | B2 * | 8/2011 | Miroewski | B62K 9/00 446/431 |
| 7,997,604 | B2 * | 8/2011 | Griep | B62J 25/04 74/564 |
| 8,517,406 | B2 * | 8/2013 | Diekman | B62K 9/02 280/282 |
| 8,844,960 | B2 * | 9/2014 | Young | B62K 15/00 280/278 |
| 9,254,884 | B2 * | 2/2016 | Jessie, Jr. | B62K 13/04 |
| 10,011,316 | B2 * | 7/2018 | Ben Meir | B62K 5/02 |
| 10,336,394 | B2 * | 7/2019 | Fitzwater | B62B 9/14 |
| 10,589,772 | B2 * | 3/2020 | O Connell | B62K 9/02 |
| 10,654,541 | B2 * | 5/2020 | Etzelsberger | B62K 15/006 |
| 10,933,938 | B2 * | 3/2021 | Mazar | B62B 7/12 |
| 2008/0277901 | A1 * | 11/2008 | Catelli | B62K 9/02 280/287 |
| 2016/0355230 | A1 * | 12/2016 | Fitzwater | B62B 9/20 |
| 2018/0257727 | A1 | 9/2018 | Ye | |

FOREIGN PATENT DOCUMENTS

| | | | | |
|---|---|---|---|---|
| CN | 212637780 U | * | 3/2021 | ........... B62K 15/006 |
| CN | 112722133 A | * | 4/2021 | ........... B62K 15/006 |
| DE | 202017004525 U1 | * | 11/2017 | ............ B62K 15/00 |
| DE | 102021128675 A1 | * | 5/2023 | |
| EP | 2786926 A1 | * | 10/2014 | ........... B62K 15/006 |
| EP | 3543102 A1 | * | 9/2019 | ............... B62K 9/02 |
| GB | 2529603 A | * | 3/2016 | ............ B62K 13/08 |
| JP | 2002127973 A | * | 5/2002 | |
| JP | 2018108807 A | * | 7/2018 | ............. B62B 7/042 |
| KR | 20110114963 | | 10/2011 | |
| KR | 20110114963 A | * | 10/2011 | |
| KR | 20150052173 A | * | 5/2015 | |
| WO | WO2013/036990 | | 3/2013 | |
| WO | WO-2013036990 A2 | * | 3/2013 | ........... B62K 15/008 |
| WO | WO-2016055538 A1 | * | 4/2016 | ............... B62B 7/12 |
| WO | WO-2018134500 A1 | * | 7/2018 | ............... B62K 9/02 |

* cited by examiner

VEHICLE FOR AN INFANT

FIELD OF THE INVENTION

The present invention relates to the technical field of children's vehicles, and in particular to the field of convertible vehicles for small children.

BACKGROUND OF THE INVENTION

Known from the state of the art is a children's vehicle comprising a front wheel and two rear wheels. Each rear wheel is rotatably mounted on a wheel carrier about an axis of rotation that is substantially perpendicular to the plane formed by the two wheel carriers. Thus, the two rear wheels are movable between a tricycle position where they are separated from each other and a bicycle position where they are in contact with each other to form a single wheel. The wheel carriers are also movable in the plane they form. The wheel carriers are close together in bicycle mode and spread apart in tricycle mode.

The vehicle as known from the state of the art is not compact for transport. When it is not in use by a child, an adult must move the vehicle, which is very bulky and cannot be stored in a small space, for example in a car trunk or an airplane hold.

Furthermore, to switch from one mode to another, it is necessary to manipulate the wheel carriers to modify the angle between them, which is complicated and wastes time.

SUMMARY OF THE INVENTION

The object of the invention is in particular to propose a children's vehicle that is compact for transport, while being robust and stable during use.

To this end, the object of the invention is a children's vehicle comprising:

a vehicle body having a front end and a rear end, a front steering unit mounted on the front end and comprising a steering column on which a front wheel and a handlebar are mounted, a seat mounted between the front end and the rear end, a first rear wheel connected to the vehicle body via a first wheel carrier and a second rear wheel connected to the vehicle body via a second wheel carrier, the first and the second wheel carriers being rotatably mounted on the rear end between a compact configuration in which the first and second rear wheels are positioned near the front end and a deployed configuration in which the first and second rear wheels are spaced apart from the front end so as to be operational, the first and the second wheel carriers being movable between the two configurations independently of each other.

This allows a compact configuration of the vehicle to be offered so that it can be transported or dragged on the ground for easy movement. In fact, when the wheel carriers are in the compact configuration, the entire length of the wheel carriers draws adjacently closer to the body of the vehicle to bring the rear wheels toward the front of the vehicle, which significantly reduces the volume of the vehicle.

It is understood that the compact configuration corresponds to a configuration where the vehicle is folded as a whole in a compact manner to be transported or dragged on the ground and that the deployed configuration corresponds to a configuration where the vehicle is operational, that is to say, in bicycle or tricycle mode.

According to other optional features of the invention, taken alone or in combination:

The first wheel carrier is rotatably mounted about a first axis of rotation on the rear end and the second wheel carrier is rotatably mounted about a second axis of rotation on the rear end, each of the first and second axes of rotation forming an angle of between 60° and 90°, inclusive, with the median plane of the vehicle body. Preferably, said angle is between 70° and 85°. According to one embodiment, said angle is around 80°.

With such a configuration, the axes of rotation are horizontal, or very close to a position where they are orthogonal with the vertical. In other words, the axes of rotation are oriented in such a way that they are not stressed in torsion when the wheel carriers are in the deployed position. Thus, the weights of the vehicle and of the child seated on the seat have little impact on the play necessary for the movement of the wheel carriers because these movements are substantially transverse. The vehicle is therefore more stable during use and less likely to be damaged over time.

Indeed, in the vehicle of the state of the art, since the axes of rotation are substantially perpendicular to the plane formed by the two wheel carriers, they are substantially vertical. Thus, the weight of the vehicle and the weight of the child exert torsion on these axes, which can weaken the axial mounting after a certain usage time.

It is understood that the median plane corresponds to a plane separating the vehicle into a left part and a right part that are symmetrical with respect to the plane. The median plane most often contains the vertical when the vehicle is in use.

The first axis of rotation and the second axis of rotation are normal to planes that intersect each other.

This allows the rear wheels to be brought closer together in a compact configuration for better compactness.

Preferably, the axes of rotation are inclined toward the front of the vehicle so that the distance between the rear wheels is smaller in the compact configuration than that in the deployed configuration.

The first rear wheel is rotatably mounted on the first wheel carrier about a third axis of rotation and the second rear wheel is rotatably mounted on the second wheel carrier about a fourth axis of rotation, the third axis of rotation and the fourth axis of rotation being arranged substantially parallel to the median plane of the vehicle body.

The rotation of the rear wheels allows the vehicle to be converted into a tricycle or a bicycle. The fact that the axes of rotation are arranged parallel to the median plane of the vehicle body makes it possible to guarantee that the wheels are in alignment with the movement of the vehicle regardless of the tricycle or bicycle configuration.

Preferably, the axes of rotation are comprised in the plane defined by the first wheel carrier and the second wheel carrier.

Each rear wheel is rotatably mounted on an intermediate element that is in turn rotatable about the third axis of rotation or the fourth axis of rotation, each intermediate element being connected to the wheel carrier by fitting.

Furthermore, the axial side of each rear wheel opposite the wheel carrier is flat and the thickness of each rear wheel between the flat side and the opposite side is less than half the distance between the wheel carriers.

The vehicle comprises locking means to keep the wheel carriers in the compact configuration or the deployed configuration.

For example, the locking means may consist of a push button.

The vehicle body comprises lateral shapes configured to cooperate with one end of the wheel carrier so as to allow a rotation of approximately 180° of the wheel carrier in an area delimited by the vehicle body and the ground when the wheel carriers are in the deployed configuration.

It is therefore understood that the wheels are brought forward by passing under the tricycle.

The vehicle comprises a footrest between the front end and the rear end, the footrest comprising a footrest support and two flaps arranged on either side of the footrest support, the flaps being configured to cooperate with the wheel carriers to pass from a horizontal position to a vertical position.

The ends of the flaps are configured to come into contact with the wheel carriers when they arrive at a predetermined intermediate position between the compact configuration and the deployed configuration. The movement of the wheel carriers then causes the flaps to rise.

Furthermore, the flaps have symmetrical shapes with respect to the footrest support.

It is understood that the flaps are substantially parallel to the ground when they are in the horizontal position and substantially perpendicular to the ground when they are in the vertical position.

The flaps are rotatably mounted on axes of rotation that are normal to planes that intersect each other.

The vehicle comprises means for retaining the flaps in the vertical position, the retaining means being separate from the wheel carriers.

Thus, the flaps are locked in the vertical position even when the wheel carriers enter the deployed configuration, which prevents any involuntary opening of the flaps. Furthermore, flapping movements of the flaps in the vertical position are avoided due to the presence of play between the parts.

The retaining means are, for example, a mobile element for blocking the flaps or an element allowing snap-fastening between the flaps and the footrest support.

BRIEF DESCRIPTION OF THE FIGURES

The invention will be better understood upon reading the description that follows, given solely by way of example and with reference to the appended drawings, in which.

DETAILED DESCRIPTION OF THE INVENTION

Figure 1:
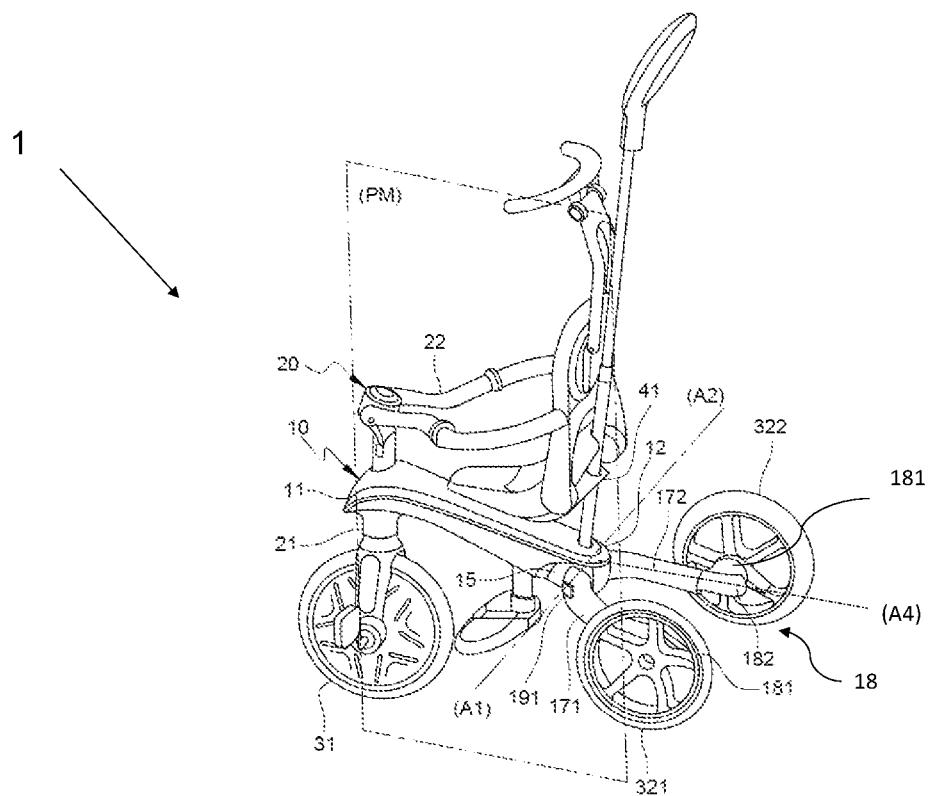
FIG. 1 is a perspective view of a children's vehicle according to one embodiment of the invention, the vehicle being in the deployed configuration.

FIGS. 1 to 4 show a children's vehicle according to one embodiment of the invention, designated by the general reference sign 1. The vehicle comprises a vehicle body 10 having a front end 11 provided with a front steering unit 20. The front steering unit 20 comprises a steering column 21 on which a front wheel 31 and a handlebar 22 are mounted. The vehicle body 10 also has a rear end 12 on which a first rear wheel 321 and a second rear wheel 322 are mounted. The first and second rear wheels 321, 322 are connected to the rear end 12 of the vehicle body 10 via wheel carriers 171, 172.

As seen in FIG. 1, the children's vehicle 1 further comprises a seat 41 mounted between the front end 11 and the rear end 12 and connected to the vehicle body 10 by a mounting tube passing through a hole arranged on the vehicle body 10. The vehicle also comprises a maneuvering rod for maneuvering by an adult that is placed at the rear of the vehicle. The rod comprises a handle for control of the vehicle by the accompanying adult. The rod is engaged in a housing arranged at the rear of the vehicle body 10.

Figure 2:
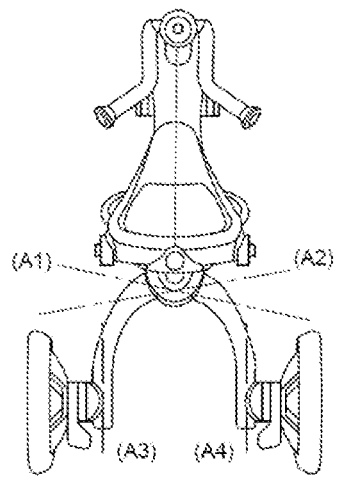
FIG. 2 is a top view of the children's vehicle of FIG. 1.

FIGS. 1 and 2 illustrate the children's vehicle 1 in its deployed configuration. Since the front wheel 31 and the rear wheels 321, 322 are in the rolling position, the vehicle is operational as a tricycle. As seen in these figures, the first wheel carrier 171 is rotatably mounted about a first axis of rotation (A1) on the rear end 12 and the second wheel carrier 172 is rotatably mounted about a second axis of rotation (A2) on the rear end 12. Therefore, the first and the second wheel carriers are rotatable independently relative to each other. Each of the first and second axes of rotation (A1, A2) forms an angle of approximately 80° with the median plane (PM) of the vehicle body (10). In the illustrated embodiment, each axis of rotation forms a non-right angle with the median plane (PM) in such a way that the first axis of rotation (A1) and the second axis of rotation (A2) are normal to planes that intersect each other, as seen in FIG. 2 in particular. The orientation of the axes of rotation A1 and A2 in particular allows the weight of the vehicle and of any child seated thereon to act on the axes A1 and A2 transversely, owing to the fact that said axes are substantially horizontal. The weights therefore have no effect on the operating clearances of the axes that are necessary for their rotation, or on the torsion resistance of the axes.

Still in FIGS. 1 and 2, it is visible that each rear wheel 321, 322 is rotatably mounted on an intermediate element 18. Each intermediate element 18 comprises a first portion 181 rotatably receiving the corresponding rear wheel and a second portion 182 having a substantially cylindrical shape. Each wheel carrier 171, 172 has a hollow end to receive the second portion 182 of the intermediate element 18 by fitting.

According to a particular variant, the tricycle can be converted into a bicycle by placing the two rear wheels side by side. To this end, each second portion 182 of the intermediate element 18 is rotatably mounted on the corresponding wheel carrier so that the intermediate element 18 is rotatable about a third axis of rotation (A3) or a fourth axis of rotation (A4), the third axis of rotation (A3) and the fourth axis of rotation (A4) being arranged substantially parallel to the median plane (PM) of the vehicle body 10.

Figure 3:
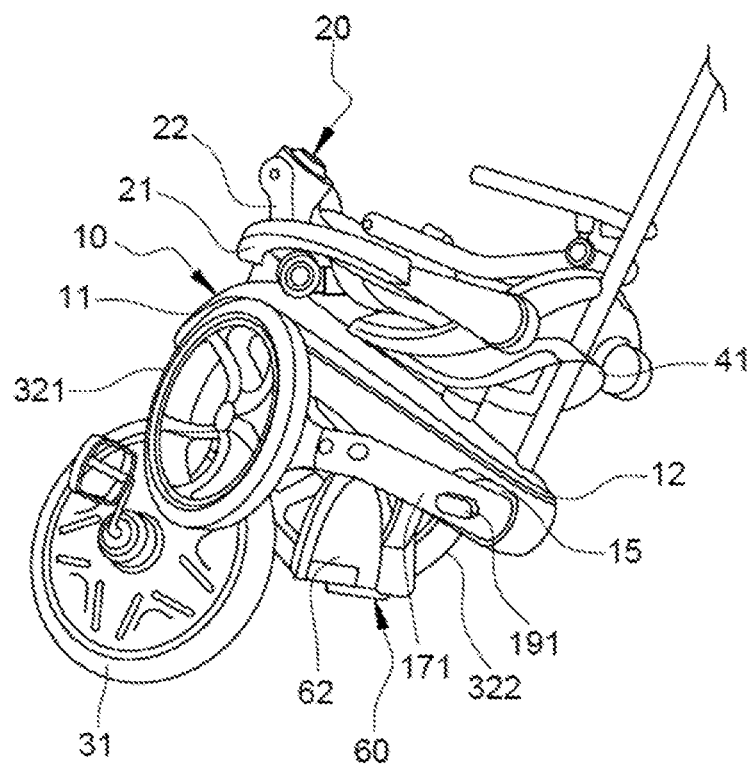
FIG. 3 is a perspective view of the children's vehicle of FIG. 1, the vehicle being in a compact configuration.

FIG. 3 illustrates the children's vehicle 1 when it is in its compact configuration. To do this, starting from the deployed configuration of the vehicle where the rear wheels 321, 322 are remote from the front end 11, the wheel carriers 171, 172 are rotated about their axes of rotation A1, A2 in the clockwise direction according to FIG. 1 to bring the first and second rear wheels 321, 322 toward the front end 11 of the vehicle body 10. At the end of rotation and when the vehicle is in a compact configuration, the wheel carriers 171, 172 are substantially parallel to the vehicle body 10 and the rear wheels 321, 322 are adjacent to the front end 11.

As seen in FIGS. 1 and 3, the vehicle body 10 comprises lateral shapes 15 that are notches 15 arranged on each lateral side of the rear end 12 of the vehicle body 10. Each notch 15 is sized to cooperate with one end of the wheel carrier 171, 172 so as to allow a rotation of approximately 180° of the wheel carrier in the clockwise direction.

In order to keep the wheel holders 171, 172 in the compact configuration or the deployed configuration, the children's vehicle 1 comprises locking means 191, 192, which are push buttons arranged on each wheel holder 171, 172 and cooperating with the vehicle body 10 in order to lock the wheel carriers 171, 172.

Figure 4A:
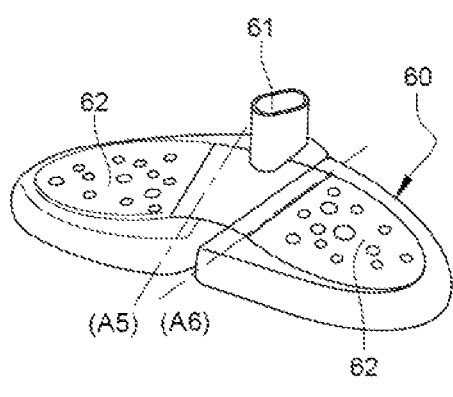
FIG. 4a is view of a footrest of the vehicle of FIG. 1 in a first position.
Figure 4B:
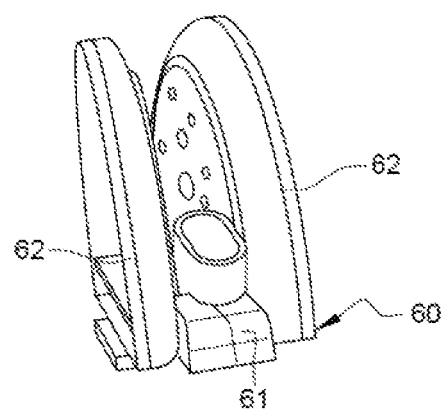
FIG. 4b is view of a footrest of the vehicle of FIG. 1 in a second position.

FIGS. 4a and 4b illustrate a footrest 60 that is also visible in FIGS. 1 and 3 in its version mounted on the children's vehicle 1. The footrest 60 is arranged between the front end 11 and the rear end 12 of the vehicle body 10 and comprises a footrest support 61. The footrest 60 further comprises two flaps 62 arranged on either side of the footrest support 61, the flaps 62 being configured to cooperate with the wheel carriers 171, 172 to pass from a horizontal position illustrated by FIGS. 1 and 4a to a vertical position illustrated by FIGS. 3 and 4b.

The flaps 62 have symmetrical shapes with respect to the footrest support 61. Each flap 62 has a width (L) large enough for the ends of the flaps 62 to be able to come into contact with the wheel carriers 171, 172 when the latter arrive at a predetermined intermediate position between the compact configuration and the deployed configuration. The movement of the wheel carriers 171, 172 then causes the flaps to rise. Depending on the spacing of the wheel carriers 171, 172 and the position of the footrest 60 on the vehicle, those skilled in the art could easily obtain the satisfactory width by carrying out calculations or tests.

Furthermore, as illustrated by FIG. 4a, each flap 62 is rotatably mounted on a footrest rotation axis (A5, A6). The two footrest rotation axes (A5, A6) are normal to planes that intersect each other. In the example shown, the flaps 62 are held in the vertical position by the wheel carriers 171, 172 when the children's vehicle 1 is in its compact configuration.

The invention is not limited to the embodiments described here, and other embodiments will become clearly apparent to a person skilled in the art. It is in particular possible to envisage means for retaining the flaps in the vertical position, the retaining means being separate from the wheel carriers 171, 172.

LIST OF REFERENCES

1: children's vehicle
10: vehicle body
11: front end
12: rear end
15: lateral shapes
20: front steering unit
21: steering column
22: handlebar
31: front wheel
41: seat
60: footrest
61: footrest support
62: flaps
70: rod
71: handle
171: first wheel carrier
172: second wheel carrier
18: intermediate element
181: first portion
182: second portion
191, 192: locking means
321: first rear wheel
322: second rear wheel
A1: first axis of rotation
A2: second axis of rotation
A3: third axis of rotation
A4: fourth axis of rotation
A5, A6: footrest rotation axes
PM: median plane
S1: clockwise

The invention claimed is:

1. A vehicle for an infant comprising:
a vehicle body (10) having a front end (11) and a rear end (12),
a front steering unit (20) mounted on the front end (11) and comprising a steering column (21) on which a front wheel (31) and a handlebar (22) are mounted,
a seat (41) mounted between the front end (11) and the rear end (12),
a first rear wheel (321) connected to the vehicle (10) body via a first wheel carrier (171) and a second rear wheel (322) connected to the vehicle body (10) via a second wheel carrier (172),
the first and the second wheel carriers (171, 172) being rotatably mounted on the rear end (12) between a compact configuration in which the first and second rear wheels (321, 322) are positioned near the front end (11) and a deployed configuration in which the first and second rear wheels (321, 322) are spaced apart from the front end (11) so as to be operational,
the first and the second wheel carriers (171, 172) being movable between the two configurations independently of each other,
wherein the vehicle body (10) comprises lateral shapes (15) configured to cooperate with one end of the wheel carrier (171, 172) so as to allow a rotation of approximately 180° of the wheel carrier in an area delimited by the vehicle body (10) and the ground when the wheel carriers (171, 172) are in the deployed configuration;
a footrest (60) between the front end (11) and the rear end (12), the footrest (60) comprising a footrest support (61) and two flaps (62) arranged on either side of the footrest support (61), the flaps (62) being configured to cooperate with the wheel carriers (171, 172) to pass from a horizontal position to a vertical position; and
wherein the flaps (62) are rotatably mounted on axes of rotation that are normal to planes that intersect each other.

2. The vehicle according to claim 1, wherein the first wheel carrier (171) is rotatably mounted about a first axis of rotation (A1) on the rear end (12) and the second wheel carrier (172) is rotatably mounted about a second axis of rotation (A2) on the rear end (12), each of the first and second axes of rotation (A1, A2) forming an angle of between 60° and 90°, inclusive, with the median plane (PM) of the vehicle body (10).

3. The vehicle according to claim 2, wherein the first axis of rotation (A1) and the second axis of rotation (A2) are normal to planes that intersect each other.

4. The vehicle according to claim 1, wherein the first rear wheel (321) is rotatably mounted on the first wheel carrier (171) about a third axis of rotation (A3) and the second rear wheel (322) is rotatably mounted on the second wheel carrier (172) about a fourth axis of rotation (A4), the third axis of rotation (A3) and the fourth axis of rotation (A4) being arranged substantially parallel to the median plane (PM) of the vehicle body (10).

5. The vehicle according to claim 4, wherein each rear wheel (321, 322) is rotatably mounted on an intermediate element (18) that is in turn rotatable about the third axis of rotation (A3) or the fourth axis of rotation (A4), each intermediate element (18) being connected to the wheel carrier (171, 172) by fitting.

6. The vehicle according to claim 1, comprising locking device (191, 192) to keep the wheel carriers (171, 172) in the compact configuration or the deployed configuration.

7. The vehicle according to claim 1, comprising a retaining device for retaining the flaps (62) in the vertical position, the retaining device being separate from the wheel carriers (171, 172).

* * * * *